(12) United States Patent
Sako

(10) Patent No.: US 9,183,477 B2
(45) Date of Patent: Nov. 10, 2015

(54) PRINTING APPARATUS, METHOD FOR CONTROLLING THE SAME, AND STORAGE MEDIUM

(71) Applicant: Canon Kabushiki Kaisha, Tokyo (JP)

(72) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,535

(22) Filed: Feb. 19, 2014

(65) Prior Publication Data

US 2014/0240767 A1 Aug. 28, 2014

(30) Foreign Application Priority Data

Feb. 22, 2013 (JP) ................................. 2013-033421

(51) Int. Cl.
*G06F 3/12* (2006.01)
*G06K 15/00* (2006.01)
*H04N 1/00* (2006.01)
*G06K 15/02* (2006.01)

(52) U.S. Cl.
CPC .......... *G06K 15/4045* (2013.01); *G06F 3/1204* (2013.01); *G06F 3/1257* (2013.01); *G06F 3/1292* (2013.01); *G06K 15/1806* (2013.01); *H04N 1/00204* (2013.01); *H04N 1/00278* (2013.01)

(58) Field of Classification Search
USPC .......................................... 709/238, 224, 217
See application file for complete search history.

(56) References Cited

U.S. PATENT DOCUMENTS

| 7,317,549 | B2 * | 1/2008 | Naito ........................... 358/1.15 |
| 7,710,997 | B2 * | 5/2010 | Mokuya et al. ............... 370/465 |
| 8,223,355 | B2 * | 7/2012 | McCoog et al. ............. 358/1.15 |
| 8,896,859 | B2 * | 11/2014 | Otsuka ........................ 358/1.15 |
| 2003/0223094 | A1 * | 12/2003 | Naito ........................... 358/1.15 |
| 2004/0051899 | A1 * | 3/2004 | Saitoh et al. ................. 358/1.14 |
| 2008/0024816 | A1 * | 1/2008 | Lee .............................. 358/1.15 |
| 2012/0268778 | A1 * | 10/2012 | Nakawaki .................... 358/1.15 |
| 2013/0057908 | A1 * | 3/2013 | Park ............................. 358/1.15 |
| 2013/0100486 | A1 * | 4/2013 | Mccoog et al. ............. 358/1.15 |
| 2014/0293342 | A1 * | 10/2014 | Tsutsumi ..................... 358/1.15 |
| 2014/0337514 | A1 * | 11/2014 | Maruyama ................... 709/224 |

FOREIGN PATENT DOCUMENTS

JP 2012-199884 A 10/2012

* cited by examiner

*Primary Examiner* — Satwant Singh
(74) *Attorney, Agent, or Firm* — Canon USA Inc. IP Division

(57) ABSTRACT

A user preregisters to a printing apparatus IPP print settings used when printing print data received through IPP. Upon reception of the print data through IPP, the printing apparatus prints the print data based on the preregistered IPP print settings. The printing apparatus includes a printing unit configured to perform printing, a storage unit configured to store settings regarding printing using a specific print protocol, a reception unit configured to receive print data transmitted from an external apparatus, a determination unit configured to, when the reception unit receives print data by using the specific print protocol, determine whether a communication method used for receiving the print data is a specific communication method, and a control unit configured to, based on a result of determination by the determination unit, determine whether the settings stored in the storage unit are to be used when printing the print data.

8 Claims, 7 Drawing Sheets

FIG.4

400 PRINT SETTING SCREEN

SET IPP PRINTING

PERFORM PRINT SETTING.
WHEN PRINT JOB IS RECEIVED THROUGH IPP,
PRINTING WILL BE PERFORMED WITH THE FOLLOWING
PRINT SETTINGS.

- 401 — PAPER SIZE — A4
- 402 — COLOR PRINTING — COLOR
- 403 — TWO-SIDED PRINTING — TWO-SIDED PRINTING
- 404 — N in 1 PRINTING — 2 in 1
- 405 — STAPLING — YES

406 — [REGISTER]   [RETURN]

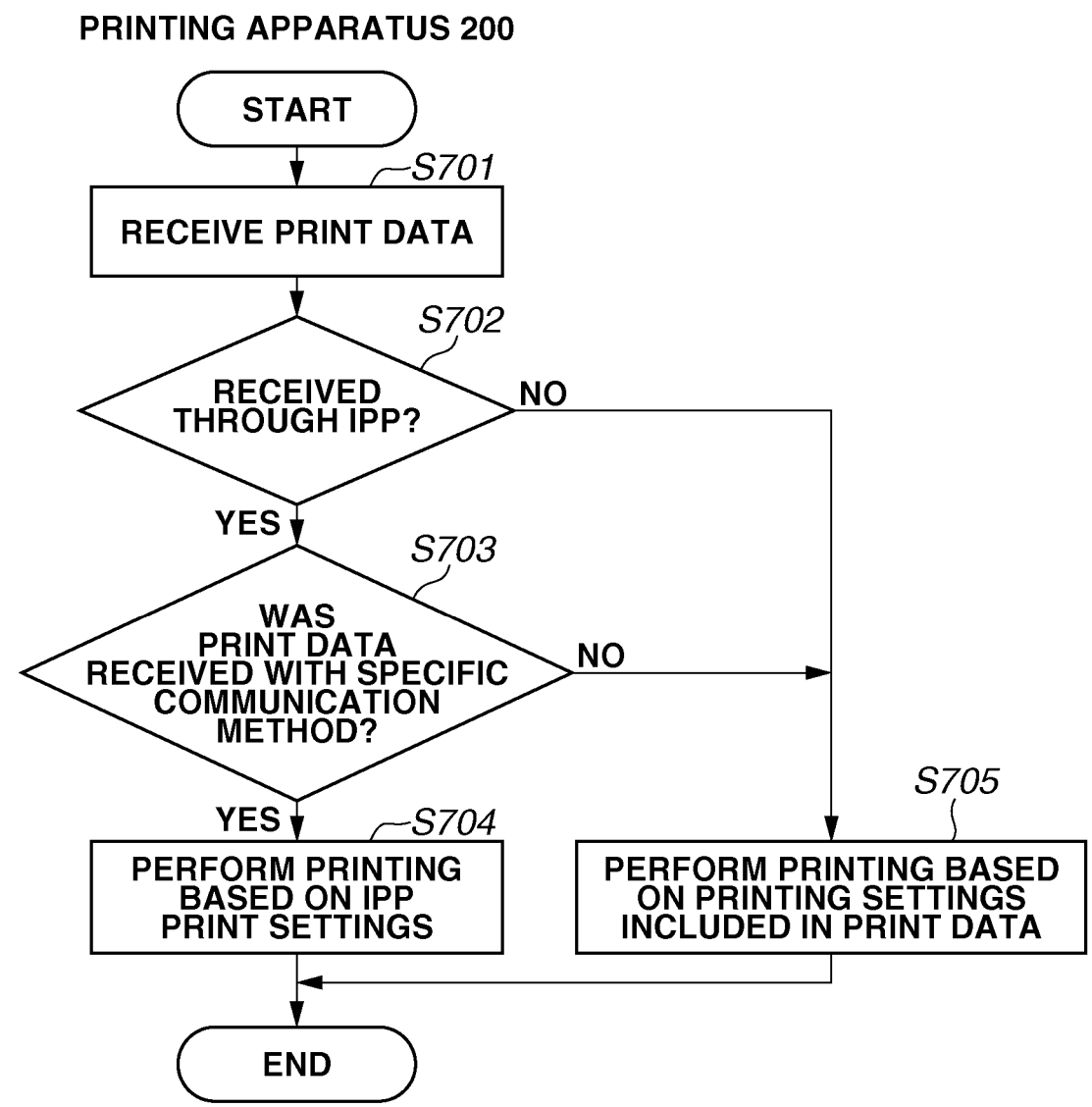

PRINTING APPARATUS, METHOD FOR CONTROLLING THE SAME, AND STORAGE MEDIUM

BACKGROUND OF THE INVENTION

1. Field of the Invention

The present invention generally relates to printing and, more particularly, to a printing apparatus, a method for controlling the printing apparatus, and a storage medium.

2. Description of the Related Art

As to information processing apparatuses, such as printing apparatuses, PCs, and portable terminals, the number of them having a wireless LAN function is increasing. An information processing apparatus having the wireless LAN function connects to an access point as a client, and communicates with an external apparatus via the access point.

A Wi-Fi Direct® standard is established by Wi-Fi Alliance. Wi-Fi Direct prescribes a protocol for determining whether an information processing apparatus, such as a printing apparatus and a personal computer (PC), operates as an access point or a client. Performing this protocol enables automatically determining an information processing apparatus which will serve as an access point, and an information processing apparatus which will serve as a client. Using Wi-Fi Direct eliminates the need of separately preparing an access point, and enables information processing apparatuses to directly perform wireless communication with each other.

FIG. 1 simply illustrates a processing sequence of Wi-Fi Direct. A printing apparatus and a portable terminal are examples of information processing apparatuses supporting Wi-Fi Direct.

In step S101, each of the printing apparatus and the portable terminal performs a device search to identify a remote device to communicate with. In step S102, when each of the printing apparatus and the portable terminal identifies a remote device to communicate with through the device search, they determine which will serve as an access point (GroupOwner) and which will serve as Client. The processing in step S102 is referred to as role determination. Referring to FIG. 1, suppose that the printing apparatus serves as GroupOwner and the portable terminal serves as Client as a result of the role determination in step S102.

In step S103, based on WPS (Wi-Fi Protected Setup) established by Wi-Fi Alliance, the printing apparatus (GroupOwner) provides the portable terminal (Client) with parameters for performing connection to share the parameters therebetween. In step S104, the printing apparatus and the portable terminal perform secure connection by using the parameters.

In step S105, upon completion of secure connection, the printing apparatus and the portable terminal perform addressing for performing IP communication therebetween. In this case, the printing apparatus (GroupOwner) functions as a Dynamic Host Configuration Protocol (DHCP) server, and gives an Internet Protocol (IP) address to the portable terminal (Client).

With the above-described processing, wireless communication is established between the printing apparatus and the portable terminal. Using this wireless communication enables the printing apparatus and the portable terminal to directly communicate with each other without separately preparing an access point. Japanese Patent Application Laid-Open No. 2012-199884 discusses a technique for transmitting and receiving sound data or photograph data by using Wi-Fi Direct.

It is assumed that, when a remote device to communicate with in Wi-Fi Direct is a printing apparatus, a portable terminal transmits print data to the printing apparatus and causes the printing apparatus to print the print data. Although it is necessary to perform various print settings, such as color printing, two-sided printing, and N in 1 printing, the technique discussed in Japanese Patent Application Laid-Open No. 2012-199884 does not take into consideration how a user performs a print setting.

When the user attempts to perform a print setting with the portable terminal, usable functions differ according to the type of the printing apparatus, for example, two-sided printing or color printing cannot be executed. Installing a certain type of printing apparatus driver in the portable terminal also enables applying a print setting screen suitable for the function of the printing apparatus to the user in the portable terminal. However, it is troublesome for the user to install in the portable terminal the printing apparatus driver corresponding to the printing apparatus.

SUMMARY OF THE INVENTION

The present disclosure provides a mechanism for allowing a user to perform a desired print setting not on an external apparatus but on a printing apparatus when transmitting print data from the external apparatus, such as a portable terminal, to the printing apparatus.

The present disclosure is directed to a printing apparatus. A printing apparatus according to the present disclosure includes a printing unit configured to perform printing, a storage unit configured to store settings regarding printing using a specific print protocol, a reception unit configured to receive print data transmitted from an external apparatus, a determination unit configured to, when the reception unit receives print data by using the specific print protocol, determine whether a communication method used for receiving the print data is a specific communication method, and a control unit configured to, based on a result of determination by the determination unit, determine whether the settings stored in the storage unit are to be used when printing the print data.

Further features and aspects of the present disclosure will become apparent from the following detailed description of exemplary embodiments with reference to the attached drawings.

BRIEF DESCRIPTION OF THE DRAWINGS

FIG. 4 illustrates a print setting screen.
FIG. 7 is a flowchart illustrating processing performed by a printing apparatus according to a second exemplary embodiment.

DESCRIPTION OF THE EMBODIMENTS

Various exemplary embodiments, features, and aspects of the disclosure will be described in detail below with reference to the drawings. The following exemplary embodiments do not limit the present disclosure within the ambit of the appended claims. Not all of the combinations of the features described in the exemplary embodiments are indispensable to the solutions for the present disclosure.

Figure 2:
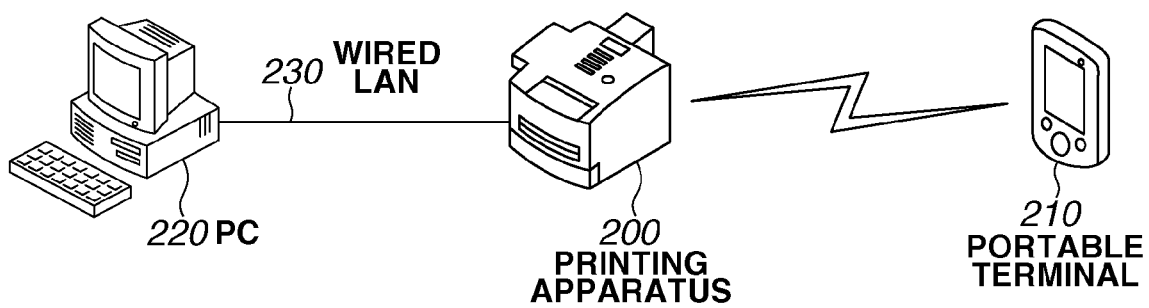
FIG. 2 illustrates a configuration of a printing system.

FIG. 2 illustrates a configuration of an entire printing system according to the present exemplary embodiment.

A printing apparatus 200 and a portable terminal 210 are capable of communicating with each other through wireless communication, such as Wi-Fi Direct. Although, in the present exemplary embodiment, the printing apparatus 200 will be described as a multifunction peripheral, the printing apparatus 200 may be a printer not having a scanner. The portable terminal 210 is, for example, a smart phone, a mobile phone, a tablet computer, or a digital camera.

The portable terminal 210 is capable of transmitting print data to the printing apparatus 200 through wireless communication, such as Wi-Fi Direct. When transmitting the print data, the portable terminal 210 uses Internet Printing Protocol (IPP) as a print protocol.

Upon reception of the print data from the portable terminal 210 through IPP, the printing apparatus 200 prints the received print data. In the present exemplary embodiment, a user preregisters print settings by using a print setting screen 400 illustrated in FIG. 4 (described below) on the printing apparatus 200. The printing apparatus 200 prints the print data received through IPP based on the preregistered print settings.

The printing apparatus 200 is also capable of communicating with a PC 220 via a wired local area network (LAN) 230. The PC 220 has a printing apparatus driver corresponding to the printing apparatus 200 installed therein, and the user can perform a desired print setting. The PC 220 transmits print data including the print setting made by the user (print data in which print setting is appended) to the printing apparatus 200, and the printing apparatus 200 prints the print data. The PC 220 uses Line Printer Remote (LPR) as a print protocol.

Figure 3:
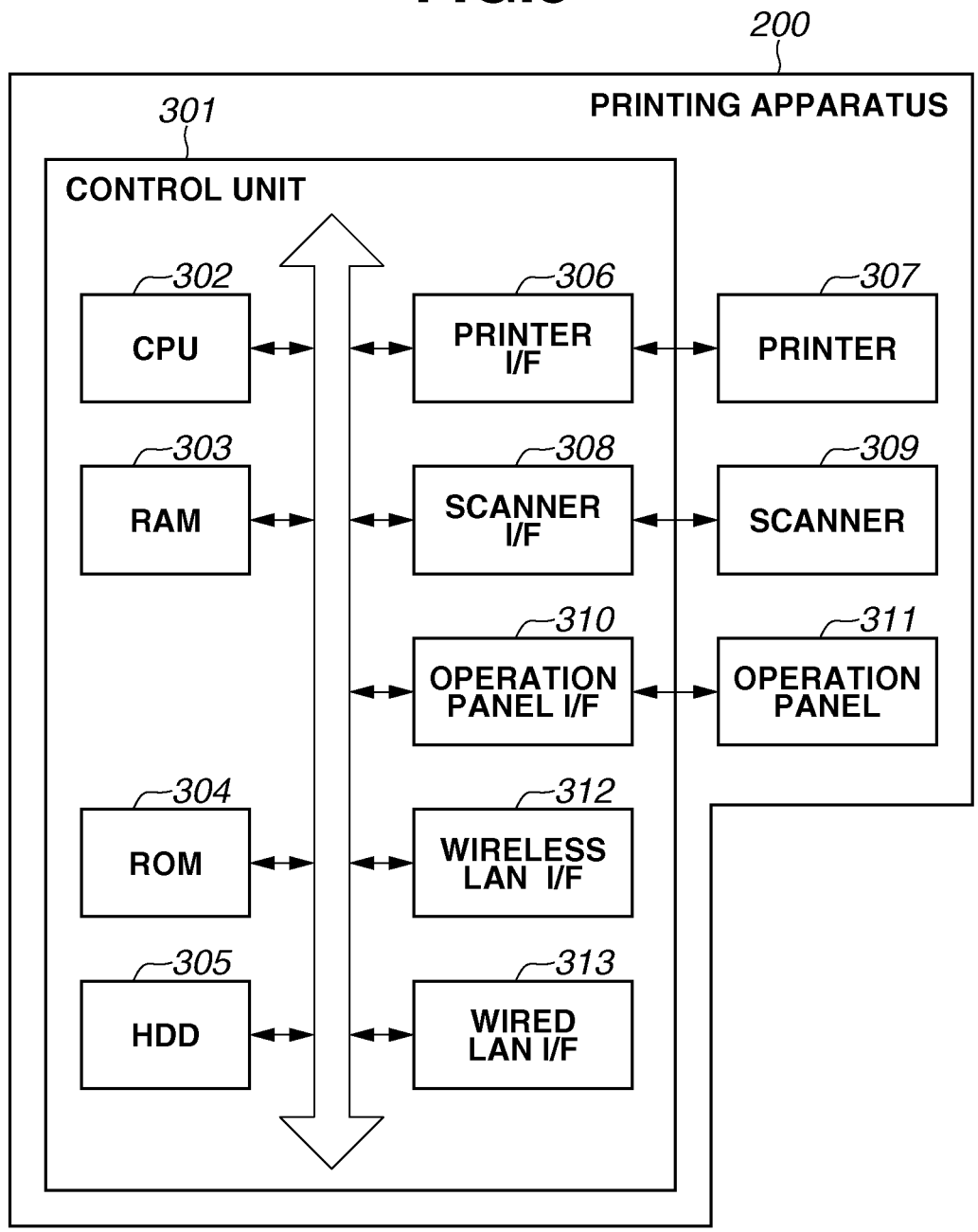
FIG. 3 illustrates a hardware configuration of a printing apparatus.

FIG. 3 illustrates a hardware configuration of the printing apparatus 200.

A control unit 301 including a central processing unit (CPU) 302 controls an operation of the entire printing apparatus 200. The CPU 302 reads a control program stored in a read-only memory (ROM) 304, and performs various control, such as communication control. A random access memory (RAM) 303 is used as a main memory for the CPU 302 and a temporary area such as a work area. A hard disk drive (HDD) 305 stores data, various programs, and various information tables. As used herein, the term "unit" generally refers to any combination of software, firmware, hardware, or other component that is used to effectuate a purpose.

A printer interface (I/F) 306 connects a printer 307 (printer engine) and the control unit 301. The printer 307 executes print processing on a sheet fed from a sheet cassette (not illustrated), based on print data input via the printing apparatus I/F 306.

A scanner I/F 308 connects a scanner 309 and the control unit 301. The scanner 309 reads a document placed thereon, and generates image data. The image data generated by the scanner 309 is printed by the printer 307, stored in the HDD 305, or transmitted to an external apparatus via a wireless LAN I/F 312 or a wired LAN I/F 313.

An operation panel I/F 310 connects an operation panel 311 and the control unit 301. The operation panel 311 is provided with a liquid crystal display unit having a touch panel function, a keyboard, and various function keys. The user can confirm a screen displayed on the operation panel 311, or input various instructions to the printing apparatus 200 by using the touch panel.

The wireless LAN I/F 312 performs wireless communication with an external apparatus, such as a portable terminal and a PC. With this wireless communication, the printing apparatus 200 receives print data from the external apparatus, and the printer 307 performs print processing based on the received print data. The printing apparatus 200 is also capable of transmitting the image data generated by the scanner 309 to the external apparatus via the wireless LAN I/F 312.

A LAN cable (not illustrated) connected to the wired LAN I/F 313 enables performing communication with an external apparatus (not illustrated).

Although, in the printing apparatus 200, the CPU 302 executes processing illustrated in each flowchart (described below) by using a memory (RAM 303), the printing apparatus 200 may have other execution modes. For example, it is also possible that a plurality of CPUs and a plurality of memories cooperate with each other to execute processing illustrated in each flowchart (described below).

As described above, the portable terminal 210 generally transmits print data through IPP. In the present exemplary embodiment, therefore, the user preregisters to the printing apparatus 200 print settings to be used when printing the print data received through IPP.

A print setting screen 400 illustrated in FIG. 4 is displayed on the operation panel 311 of the printing apparatus 200. The user can perform desired print settings by using the items 401 to 405. Although, in the present exemplary embodiment, paper size, color printing, two-sided printing, N in 1 printing, and stapling can be set as print settings, print settings which can be made by the user are not limited thereto. When the user performs desired print settings and then selects an icon 406, the print settings made by the user are stored in a memory, such as the HDD 305. In the present exemplary embodiment, print settings registered by the user by using the print setting screen 400 are referred to as IPP print settings.

Figure 1:
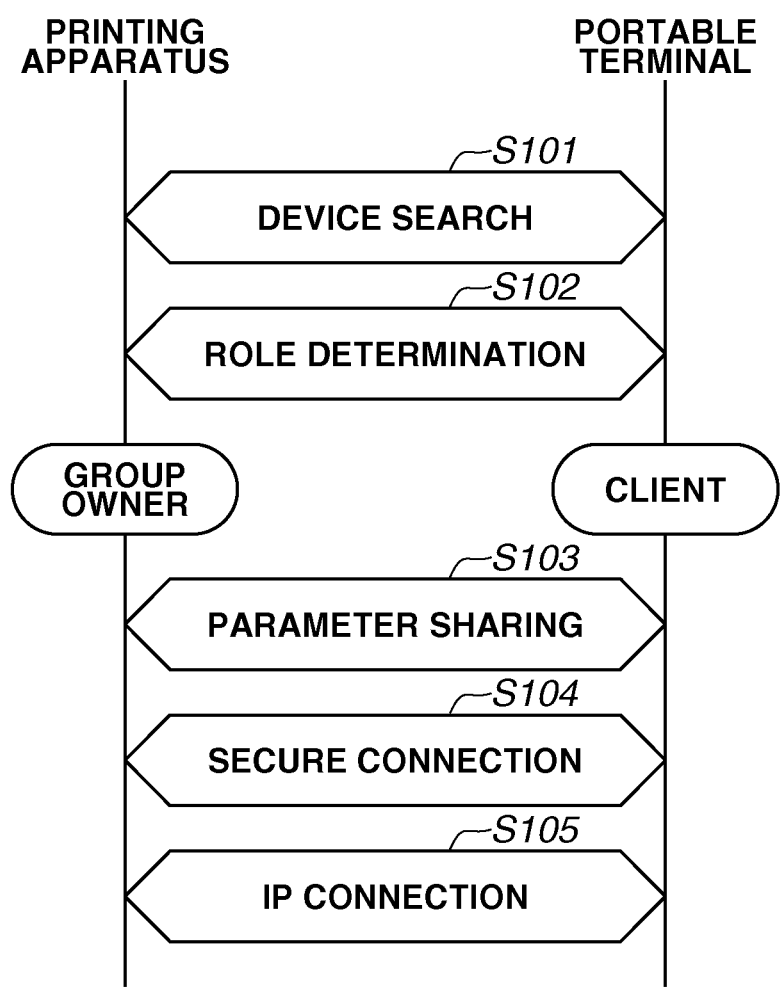
FIG. 1 illustrates a processing sequence of Wi-Fi Direct.
Figure 5:
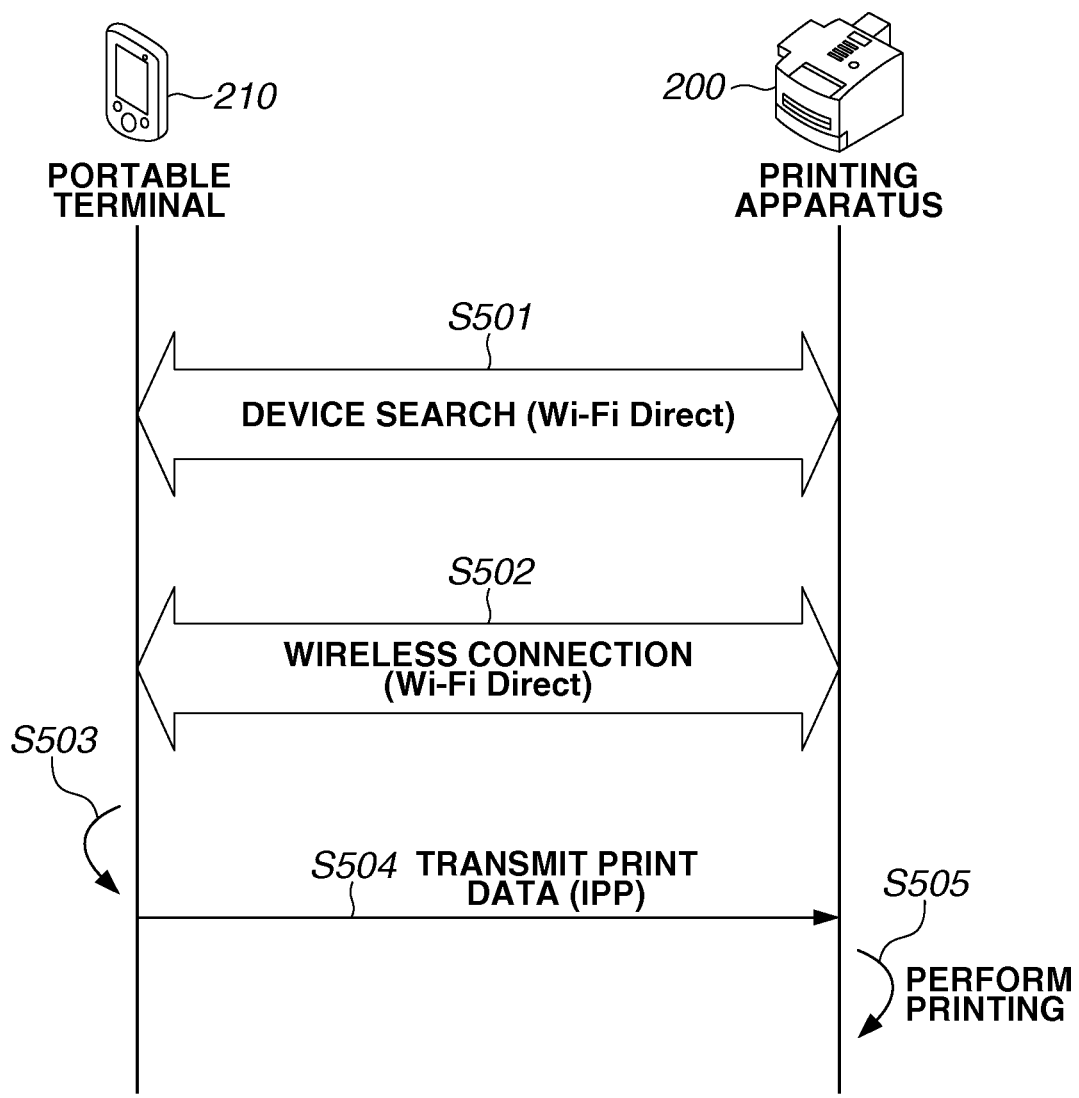
FIG. 5 illustrates a processing sequence for transmitting print data by using Wi-Fi Direct.

FIG. 5 is a sequence diagram illustrating a flow of processing in which the portable terminal 210 transmits print data to the printing apparatus 200, and the printing apparatus 200 receives and prints the print data. The printing apparatus 200 and the portable terminal 210 perform Wi-Fi Direct described in FIG. 1 as wireless communication.

When the user instructs the printing apparatus 200 and the portable terminal 210 respectively to start execution of Wi-Fi Direct, each of the printing apparatus 200 and the portable terminal 210 performs a device search illustrated in step S501. This device search enables the printing apparatus 200 and the portable terminal 210 to identify each other as a remote device to communicate with. In step S501, the printing apparatus 200 and the portable terminal 210 perform similar processing to that in step S101 illustrated in FIG. 1.

When the printing apparatus 200 and the portable terminal 210 identify each other as a remote device to communicate with through the device search in step S501, the printing apparatus 200 and the portable terminal 210 execute wireless connection in step S502. The wireless connection in step S502 establishes wireless communication between the printing apparatus 200 and the portable terminal 210. In step S502, the printing apparatus 200 and the portable terminal 210 perform similar processing to that in steps S102 to S105 illustrated in FIG. 1.

Specifically, the printing apparatus 200 and the portable terminal 210 determine which will serve as an access point (GroupOwner) and which will serve as Client. Then, the printing apparatus 200 and the portable terminal 210 share parameters by using WPS, and perform secure connection by using the parameters. Upon completion of the secure connection, the printing apparatus 200 and the portable terminal 210 perform addressing for performing IP communication therebetween. In this case, the apparatus serving as GroupOwner gives an IP address to the apparatus serving as Client. Performing such wireless connection enables establishing wireless communication between the printing apparatus 200 and the portable terminal 210.

In step S503, when wireless communication is established, the user selects on the portable terminal 210 print data to be transmitted to the printing apparatus 200. When the user selects the print data, in step S504, the portable terminal 210 transmits the user-selected print data to the printing apparatus 200. The print protocol used in this case is IPP.

Upon reception of the print data, in step S505, the printing apparatus 200 prints the received print data. At this time, the printing apparatus 200 performs printing based on the IPP print settings preregistered by the user. Specifically, even if the portable terminal 210 does not have a function of performing print settings, the user, by registering print settings to the printing apparatus 200, can perform printing by using the desired print settings.

Figure 6:
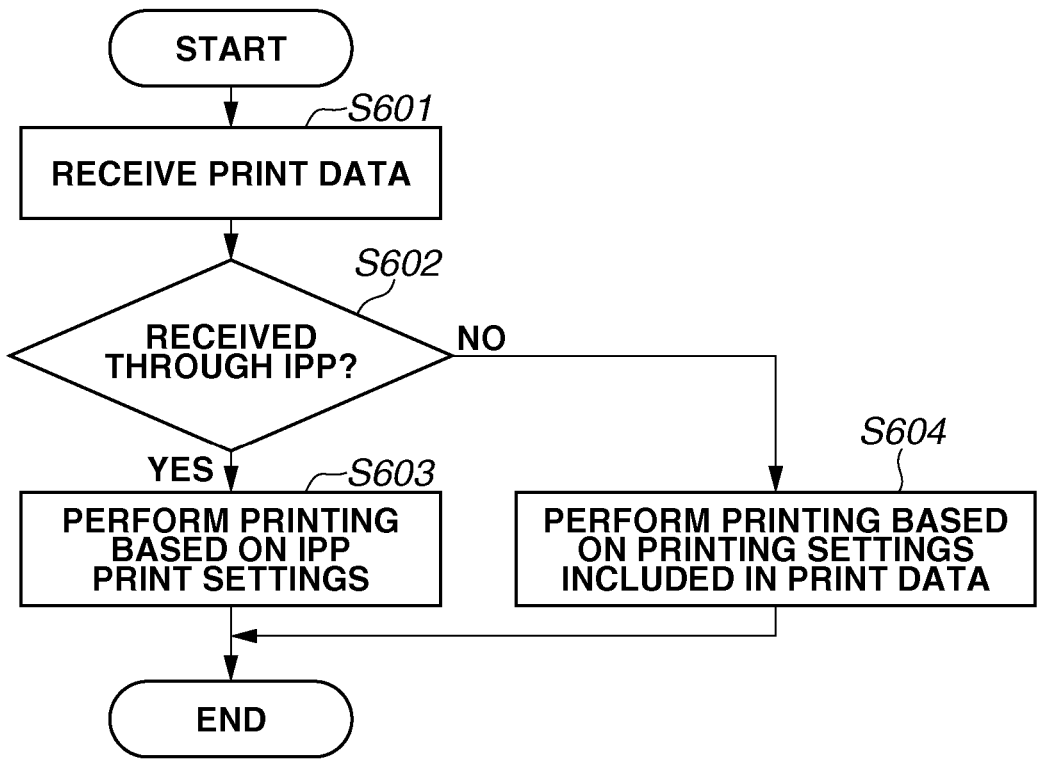
FIG. 6 is a flowchart illustrating processing performed by a printing apparatus according to a first exemplary embodiment.

FIG. 6 is a flowchart illustrating processing performed by the printing apparatus 200 at the time of printing execution. Each step in the flowchart illustrated in FIG. 6 is implemented when the CPU 302 loads a program stored in a memory, such as the ROM 304, into the RAM 303, and then executes it.

In step S601, the wireless LAN I/F 312 or the wired LAN I/F 313 receives print data transmitted from an external apparatus. When the wireless LAN I/F 312 receives print data, it receives the print data transmitted from the portable terminal 210 through wireless communication established by using Wi-Fi Direct. The print protocol used in this case is IPP. On the other hand, when the wired LAN I/F 313 receives print data, it receives the print data transmitted from the PC 220 via the wired LAN 230. The print protocol used in this case is LPR.

In step S602, the CPU 302 determines whether the print data, which was received in step S601, was through IPP. When the CPU 302 determines that the print data was received through IPP in step S602 (YES in step S602), the processing proceeds to step S603. Otherwise, when the CPU 302 determines that the print data was received not through IPP (NO in step S602), the processing proceeds to step S604. In the present exemplary embodiment, the CPU 302 determines that the print data was received not through IPP in step S602, when the print data was received through LPR.

In step S603, the printer 307 prints the received print data based on the IPP print settings stored in the memory, such as the HDD 305. The processing in step S603 is executed when print data was received through IPP. As described in FIGS. 2 and 4, the portable terminal 210 generally transmits print data to the printing apparatus 200 through IPP. Therefore, by preregistering to the printing apparatus 200 the print settings in the print data received through IPP by using the print setting screen 400, the user can perform printing based on the desired print settings without performing print settings on the portable terminal 210.

Step S604 will be described below. In step S604, the printer 307 prints the received print data based on the print settings included in the print data. Processing in step S604 is executed when print data was received through LPR. Since the user can perform desired print settings on the PC 220 which transmits print data through LPR, in step S604, the printer 307 executes printing based on the print settings included in the print data.

As described above, according to the present exemplary embodiment, the user can preregister to the printing apparatus 200 the print settings in the print data received through IPP. Therefore, the user can perform printing based on the desired print settings without performing print settings on the portable terminal 210 which transmits print data through IPP.

In the first exemplary embodiment, the portable terminal 210 transmits print data to the printing apparatus 200 through IPP, and the PC 220 transmits print data to the printing apparatus 200 through LPR. However, it is assumed that, after the user performs print settings on the PC 220, the PC 220 transmits print data through IPP. If the print data transmitted from the PC 220 through IPP is printed based on the IPP print settings registered to the printing apparatus 200, the print result will be unintended for the user who performed print settings on the PC 220. Accordingly, in the second exemplary embodiment, when print data was received through IPP, the CPU 302 determines whether the print data was received with a specific communication method. Then, based on the result of the determination, the CPU 302 determines whether the IPP print settings are to be used or not. The configuration of the printing apparatus 200 in the second exemplary embodiment is similar to that (illustrated in FIG. 3) in the first exemplary embodiment, and redundant descriptions thereof will be omitted.

FIG. 7 is a flowchart illustrating processing performed by the printing apparatus 200 at the time of printing execution. Each step in the flowchart illustrated in FIG. 7 is implemented when the CPU 302 loads a program stored in a memory, such as the ROM 304, into the RAM 303, and then executes it.

In step S701, the wireless LAN I/F 312 or the wired LAN I/F 313 receives print data transmitted from an external apparatus. When the wireless LAN I/F 312 receives print data, it receives the print data transmitted from the portable terminal 210 through wireless communication established by using Wi-Fi Direct. The print protocol used in this case is IPP. On the other hand, when the wired LAN I/F 313 receives print data, it receives the print data transmitted from the PC 220 via the wired LAN 230. The print protocol used in this case is IPP or LPR.

In step S702, the CPU 302 determines whether the print data, which was received in step S701, was through IPP. When the CPU 302 determines that the print data was received through IPP in step S702 (YES in step S702), the processing proceeds to step S703. Otherwise, when the CPU 302 determines that the print data was received not through IPP (NO in step S702), the processing proceeds to step S705.

Step S703 will be described below. In step S703, the CPU 302 determines whether the print data was received with a specific communication method. In the present exemplary embodiment, when the print data was received through wireless communication established by using Wi-Fi Direct, the CPU 302 determines that the print data was received with a specific communication method (YES in step S703), and the processing proceeds to step S704. Otherwise, when the print data was received with a communication method different from the wireless communication established by using Wi-Fi Direct, for example, through communication via the wired LAN 230, the CPU 302 determines that the print data was received not with a specific communication method (NO in step S703), and the processing proceeds to step S705.

Step S704 will be described below. In step S704, the printer 307 prints the received print data based on the IPP print settings stored in the memory, such as the HDD 305. In the first exemplary embodiment, when the print data was received through IPP, the printer 307 prints the received print data based on the IPP print settings. In the present exemplary embodiment, on the other hand, when the print data was received through IPP and the print data was received with a specific communication method (for example, wireless communication established by using Wi-Fi Direct), the printer 307 prints the received print data based on the IPP print settings.

Step S705 will be described below. In step S705, the printer 307 prints the received print data based on the print settings included in the print data. In step S705, similar to the first exemplary embodiment, when the print data was received through LPR, the printer 307 prints the print data based on the print settings included in the print data. In addition, in the present exemplary embodiment, the printer 307 prints print data received through communication via the wired LAN 230, out of the print data received through IPP, based on the print settings included in the print data.

As described above, in the present exemplary embodiment, when print data was received through IPP, the CPU 302 determines whether the print data was received through wireless communication established by using Wi-Fi Direct. Then, based on the result of the determination, the CPU determines whether the IPP print settings are to be used or not. Thus, when the communication method for the print data received through IPP is, for example, communication via the wired LAN 230, the printing apparatus 200 can print the print data based not on the IPP print settings preregistered to the printing apparatus 200 but on the print settings made by the user on the PC 220. Otherwise, when the communication method for the print data received through IPP was wireless communication established by using Wi-Fi Direct, the printing apparatus 200 can print the print data based on the IPP print settings preregistered to the printing apparatus 200.

Although, in the above-described exemplary embodiments, the printing apparatus 200 and the portable terminal 210 perform Wi-Fi Direct as wireless communication, wireless communication is not limited to Wi-Fi Direct. The present disclosure is applicable to wireless communication enabling direct communication between a plurality of communication apparatuses, such as Wi-Fi Direct.

Although, in the above-described exemplary embodiments, the portable terminal 210 transmits print data to the printing apparatus 200 through IPP as a specific print protocol, other protocols may be used as a specific print protocol. In this case, the settings in the print setting screen 400 illustrated in FIG. 4 will be set for the other print protocols.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, the user can perform desired print settings not on the external apparatus but on the printing apparatus when transmitting print data from the external apparatus, such as a portable terminal, to the printing apparatus.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims the benefit of priority from Japanese Patent Application No. 2013-033421 filed Feb. 22, 2013, which is hereby incorporated by reference herein in its entirety.

What is claimed is:

1. A printing apparatus comprising:
   a printing unit configured to perform printing;
   a displaying unit configured to display a setting screen for a user to specify print settings:
   a storage unit configured to store print settings specified by the user on the setting screen;
   a reception unit configured to receive print data transmitted from an external apparatus;
   a determination unit configured to, when the reception unit receives print data, determine whether a communication method used for receiving the print data is a specific communication method; and
   a control unit configured to control the printing unit to perform printing based on the print settings stored in the storage unit in a case where the determination unit determines that the communication method used for receiving the print data is the specific communication method, and control the printing unit to perform printing based on print settings included in the print data in a case where the determination unit determines i that the communication method used for receiving the print data is not the specific communication method.

2. The printing apparatus according to claim 1, wherein the specific communication method is a communication based on a specific protocol.

3. The printing apparatus according to claim 2, wherein the specific protocol is IPP (Internet Printing Protocol).

4. The printing apparatus according to claim 1, wherein the specific communication method is wireless communication.

5. The printing apparatus according to claim 1, wherein the specific communication method is wireless communication in which roles of wireless communication are determined between the printing apparatus and the external apparatus, and is established based on determined roles.

6. The printing apparatus according to claim 1, wherein the specific communication method is wireless communication based on Wi-Fi Direct.

7. A method for controlling a printing apparatus comprising a printing unit, and a storage unit configured to store print settings, the method comprising:
   receiving print data transmitted from an external apparatus;
   determining, when print data is received, whether a communication method used for receiving the print data is a specific communication method;
   controlling the printing unit to perform printing based on the print settings stored in the storage unit in a case where the determining determines that the communication method used for receiving the print data is the specific communication method; and
   controlling the printing unit to perform printing based on print settings included in the print data in a case where the determining determines that the communication method used for receiving the print data is not the specific communication method.

8. A non-transitory computer-readable storage medium storing a program for causing a computer to execute a method for controlling a printing apparatus comprising a printing unit, and a storage unit configured to store print settings, the method comprising:

receiving print data transmitted from an external apparatus;

determining, when print data is received, whether a communication method used for receiving the print data is a specific communication method;

controlling the printing unit to perform printing based on the print settings stored in the storage unit in a case where the determining determines that the communication method used for receiving the print data is the specific communication method; and controlling the printing unit to perform printing based on print settings included in the print data in a case where the determining determines that the communication method used for receiving the print data is not the specific communication method.

\* \* \* \* \*